United States Patent [19]
Sammataro

[11] Patent Number: 5,807,202
[45] Date of Patent: Sep. 15, 1998

[54] DIFFERENTIAL SPEED TRANSMISSION

[75] Inventor: Stephen R. Sammataro, Norwalk, Conn.

[73] Assignee: Sikorsky Aircraft Corporation, Stratford, Conn.

[21] Appl. No.: 707,568

[22] Filed: Sep. 4, 1996

[51] Int. Cl.[6] .............................. F16H 57/08; F16H 1/28
[52] U.S. Cl. ............................ 475/336; 475/9; 74/416; 74/665 A; 74/665 C
[58] Field of Search .................. 475/9, 336, 903; 74/665 A, 665 C, 416

[56] References Cited

U.S. PATENT DOCUMENTS

| | | | |
|---|---|---|---|
| 66,401 | 7/1867 | Schley | 475/336 |
| 1,350,456 | 8/1920 | Hewitt | 244/19 |
| 2,376,900 | 5/1945 | Case | 475/336 |
| 3,129,608 | 4/1964 | Watson | 74/665 C |
| 3,260,133 | 7/1966 | Mattson | 475/9 |
| 3,364,681 | 1/1968 | Glover et al. | 60/97 |
| 3,448,946 | 6/1969 | Nagatsu | 244/17.19 |
| 4,479,619 | 10/1984 | Saunders et al. | 244/60 |
| 4,489,625 | 12/1984 | White | 74/665 |
| 4,733,737 | 3/1988 | Falamak | 180/7.1 |
| 4,783,023 | 11/1988 | Jupe | 244/6 |
| 5,135,442 | 8/1992 | Bossler, Jr. | 475/1 |
| 5,271,288 | 12/1993 | Hayduk et al. | 74/462 |
| 5,299,912 | 4/1994 | Fradenburgh et al. | 416/87 |
| 5,472,386 | 12/1995 | Kish | 475/903 |

FOREIGN PATENT DOCUMENTS

| | | | |
|---|---|---|---|
| 239645 | 10/1986 | Germany | 475/336 |
| 194593 | 3/1923 | United Kingdom | 475/9 |

OTHER PUBLICATIONS

"High–Torque Right–Angle Gearbox", *NASA Tech Briefs*, Aug. 1996, vol. 20, No. 8, p. 78.

*Primary Examiner*—Charles A. Marmor
*Assistant Examiner*—Sherry Lynn Estremsky
*Attorney, Agent, or Firm*—Seidel, Gonda, Lavorgna & Monaco, PC

[57] ABSTRACT

A transmission for changing the rotational speed of an engine input shaft to a driven output shaft. The transmission includes a first and second face gears. Each face gear has first and second sets of teeth formed on it. Each set of teeth forms an annular pattern about a central axis. The second set of teeth on each face gear is located within and concentric with the first set of teeth. An input gear, adapted to be driven by the engine output shaft, is disposed between and engaged with the first sets of teeth on the first and second face gears such that rotation of the input gear produces rotation of the first and second face gears in opposite directions about the central axis. An output pinion is rotatably mounted to a pinion shaft. The output pinion is disposed between and engaged with the second sets of teeth on the first and second face gears such that rotation of the face gears produces corresponding rotation of the output pinion about the pinion shaft. The pinion shaft is adapted to rotate a driven output shaft, such as a main rotor shaft on a helicopter, about an axis coincident with the central axis. The transmission of the present invention is designed such that rotation of the first and second face gears about the central axis produces corresponding rotation of the pinion shaft and driven output shaft about the central axis.

35 Claims, 8 Drawing Sheets

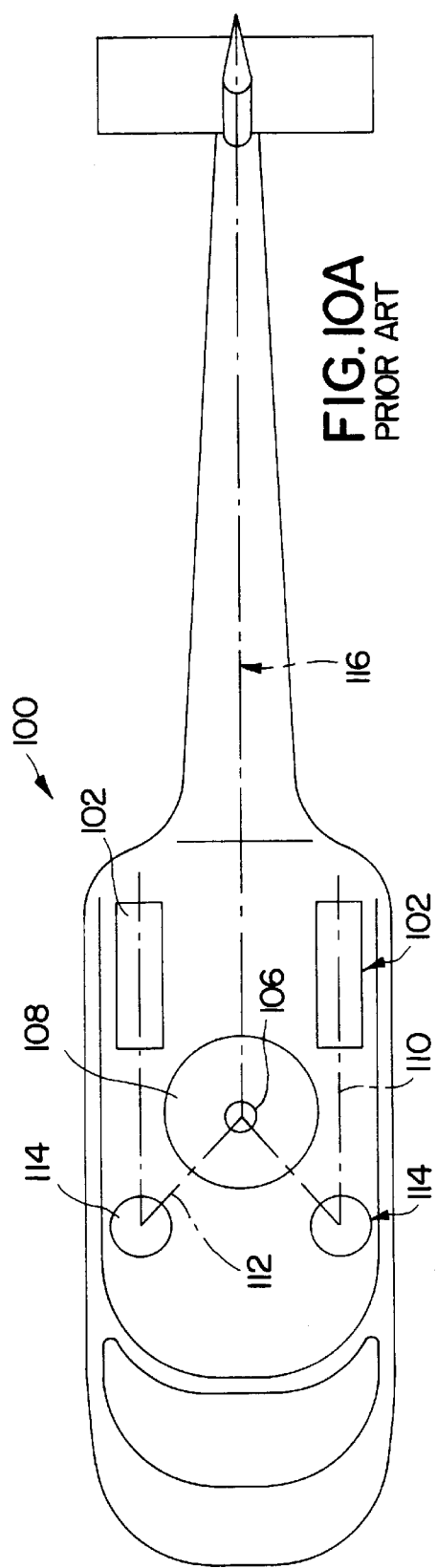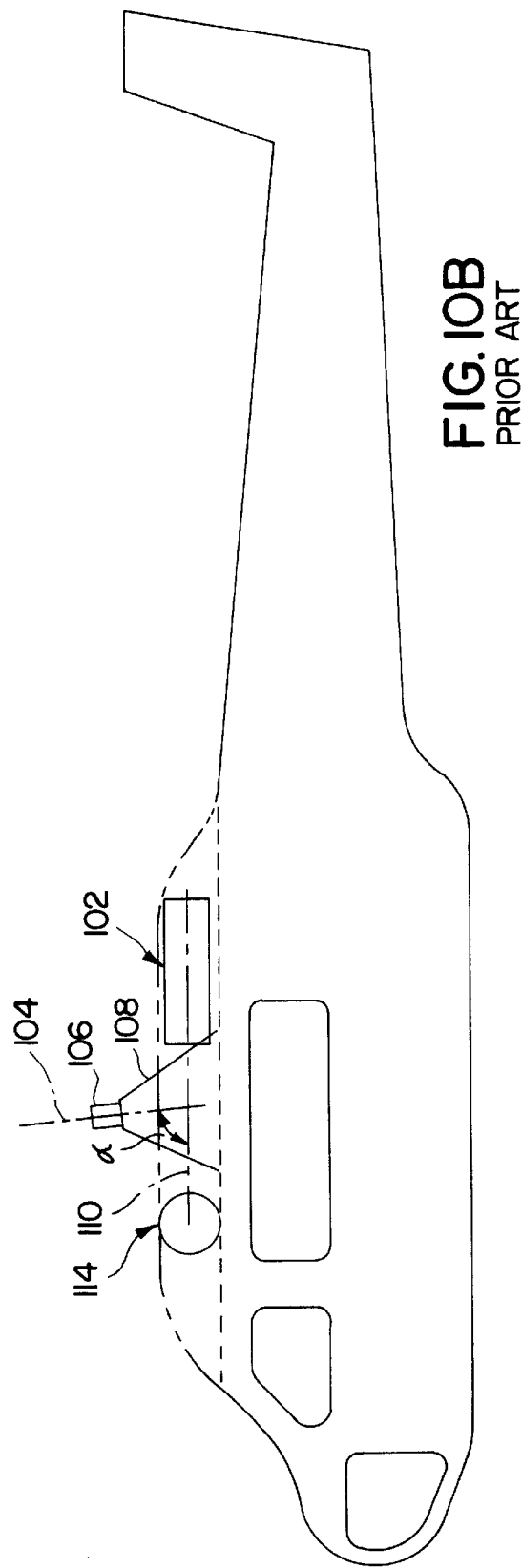
FIG. 10A PRIOR ART
FIG. 10B PRIOR ART

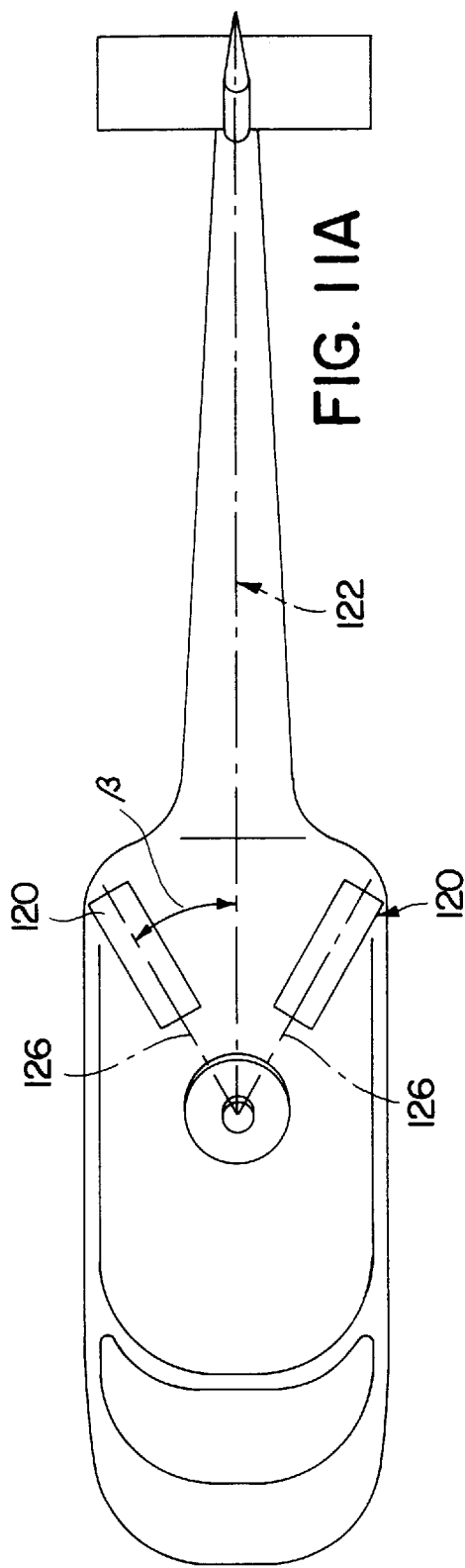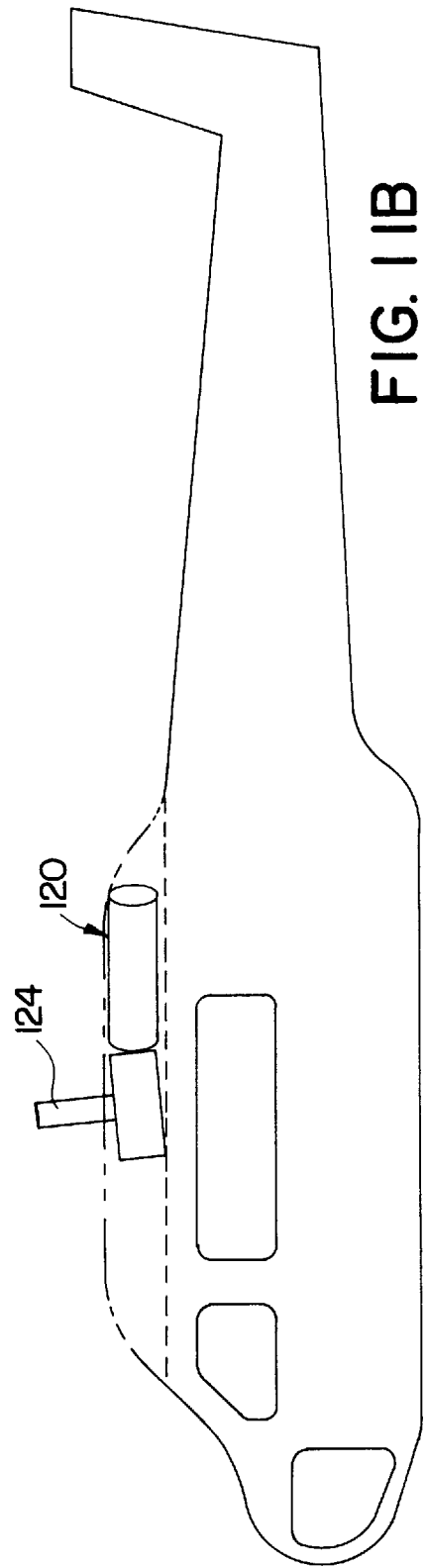

DIFFERENTIAL SPEED TRANSMISSION

FIELD OF THE INVENTION

The invention relates to a transmission arrangement and, more particularly, to a differential speed transmission incorporating two spaced face gears for providing significant speed reduction.

BACKGROUND OF THE INVENTION

Transmissions are utilized in operating machinery (e.g., aircraft, automotive, hand tools) to provide reduction or augmentation of the speed provided by an engine. Typically, electric motors, internal combustion engines, and turbine engines operate efficiently and produce maximum power when operating at high rotating speeds. The maximum motor or engine speed is usually significantly higher than the optimum speed for the machinery being driven. Accordingly, a reduction in the rotational speed output from the engine to the machinery being driven is typically required. The most common method for reducing the rotational speed output from an engine is through a gear train or transmission. For example, in a helicopter, turbine engines provide the rotational motion needed to rotate the main rotors. The rotational speed typically output from a turbine engine is about 20,000 revolutions per minute (RPM). The desired rotational speed of the main rotors in a helicopter is about 250 RPM. Accordingly, a significant reduction in rotational speed is required between the engine and the rotors in a conventional helicopter.

Many factors need to be taken into account in designing a transmission for use in an operating machine. For example, the size and weight of the transmission might govern what materials are selected and the overall configuration of the transmission. Similarly, the location of the engine with respect to the transmission might determine the placement of the reduction stages. (A stage in a transmission is defined as a gear set where there is a reduction in speed.) As stated above, the amount and size of gearing needed to provide the requisite speed reduction has a significant impact on the resulting size of the transmission.

Additionally, the drive shafts which transmit the rotational speed to the driven component may be oriented at an angle to the drive shaft leading to the transmission from the engine. For example, referring to FIG. 1, a portion of a drive train for a helicopter is illustrated. An engine (not shown) drives an input bevel shaft at high rotational speed. The input bevel shaft is in rotational engagement with a quill shaft by means of a first arrangement of gears (first stage). The quill shaft, in turn, is engaged with a second arrangement of bevel gears (second stage). The bevel gear within the second stage is rotationally connected with a planetary sun gear. The planetary sun gear drives the main rotor shaft through an arrangement of planetary pinions driving against a ring gear (third stage). In many situations the rotational axis of the input bevel shaft is at an angle other than perpendicular or parallel to the rotational axis of the main rotor shaft. For example, FIG. 2 illustrates a helicopter gear train which drives a main rotor mast or shaft and a tail rotor shaft. As shown, both the main rotor shaft and the tail rotor shaft are located at an angle to the input bevel shaft. The angular orientation of the input bevel shaft to the main and tail rotor shafts requires several complex reduction stages with associated intermediary shafts to transfer the rotational motion. For example, since the tail rotor shaft is located aft and above the input bevel shaft, a tail take-off, tail drive shaft, and intermediate and tail gearboxes are needed to transfer the rotary motion. Accordingly, a wide variety of gear arrangements may be needed in a transmission to transfer the speed and torque that is supplied.

All the factors discussed above influence the resulting transmission configuration. As is illustrated in FIGS. 1 and 2, these factors could result in a transmission which is relatively large and complex with numerous interacting parts. Such a configuration is costly to produce and is extremely heavy. Cost, reliability, and weight are the most important issues that must be considered in designing a transmission.

A secondary issue that can result from the complexity of the transmission is vibration. In an optimum gearing engagement between two rotating components, the gear teeth on one of the components is sized to precisely mate between the gear teeth on the other component. This permits efficient load transfer between the rotating gears. If, however, the teeth on the gears are not sized properly or have any imperfections which affect the mating of the gear teeth, vibration can occur. The vibration between the components ultimately results in excessive wear of the transmission components, as well as noise. As shown in FIGS. 1 and 2, the stages in a gear train may be located at a significant distance from one another. Accordingly, each stage may require its own distinct support structure. If there is any movement of one support structure with respect to another support structure, the meshing or mating of the rotating gears may not be precise, resulting in or adding to the vibration generated by the transmission. A variety of solutions have been posed over the years to address the vibrations that can develop within a transmission. For example, U.S. Pat. No. 5,271,288 to Hayduk et al. discloses a noise reduction gearing arrangement for a helicopter transmission.

While the prior art methods for reducing transmission vibration provide a workable solution for existing complex transmissions, these systems can be costly and do not adequately reduce the size and complexity of the overall transmission.

A need therefore exists for a transmission arrangement which reduces the size and complexity of a transmission, thereby decreasing the cost and weight of the transmission. A need also exists for a transmission arrangement which reduces the likelihood of vibration developing between rotating components.

SUMMARY OF THE INVENTION

The present invention is directed to a transmission for changing the rotational speed of an engine input shaft, such as for reducing the output speed of an engine for driving a rotor system in a helicopter. The transmission includes a first face gear having first and second sets of teeth formed thereon. Each set of teeth forms an annular pattern about a central axis. The second set of teeth is located within and concentric with the first set of teeth. The first and second sets of teeth are formed on a common side of the first face gear.

A second face gear is positioned adjacent to at least a portion of the first face gear and has first and second sets of teeth formed thereon. Each set of teeth on the second face gear forms an annular pattern about the central axis. The second set of teeth is located within and concentric with the first set of teeth. The first and second sets of teeth are formed on a common side of the second face gear.

An input gear, adapted to be driven by the engine output shaft, is disposed between and engaged with the first sets of teeth on the first and second face gears. The engagement between the input gear and the face gears is such that rotation of the input gear produces rotation of the first and second face gears in opposite directions about the central axis.

An output pinion is rotatably mounted to a pinion shaft. The output pinion is disposed between and engaged with the second sets of teeth on the first and second face gears. The engagement between the output pinion and the face gears is such that rotation of the face gears produces corresponding rotation of the output pinion.

The transmission also includes a driven output shaft, such as a main rotor shaft on a helicopter. The output shaft has a center of rotation coincident with the central axis of the face gears. The pinion shaft is mounted to the output shaft.

The transmission of the present invention is designed such that rotation of the first and second face gears about the central axis produces corresponding rotation of the pinion shaft and driven output shaft about the central axis.

In one embodiment of the invention, there are a plurality of input pinions, each attached to a corresponding engine output shaft. There are also a plurality of output pinions mounted on a corresponding number of pinion shafts. The pinion shafts are formed integral with the driven output shaft. In order to rotate the pinion shafts and driven output shaft about the central axis in this embodiment, the first set of teeth on the first face gear has a pitch diameter which is different than the pitch diameter of the first set of teeth on the second face gear.

In another embodiment, the gearing of the face gears, the input gear, and the output pinions are such that rotation of the input gear results in rotation of the first face gear and second face gear at different speeds. This results in translation of the pinion shaft and rotation of the driven output shaft about the central axis.

In yet another embodiment, in order to rotate the pinion shaft and driven output shaft about the central axis, the second set of teeth on the first face gear has a different pitch diameter than the second set of teeth on the second face gear.

The foregoing and other features and advantages of the present invention will become more apparent in light of the following detailed description of the preferred embodiments thereof, as illustrated in the accompanying figures.

BRIEF DESCRIPTION OF THE DRAWINGS

For the purpose of illustrating the invention, the drawings show a form of the invention which is presently preferred. However, it should be understood that this invention is not limited to the precise arrangements and instrumentalities shown in the drawings.

FIGS. 10A and 10B show top and side schematic views of a conventional transmission and engine arrangement in a helicopter.

FIGS. 11A and 11B show top and side schematic views of a transmission and engine arrangement according to the present invention in a helicopter.

DETAILED DESCRIPTION OF THE PREFERRED EMBODIMENTS

Figure 1:
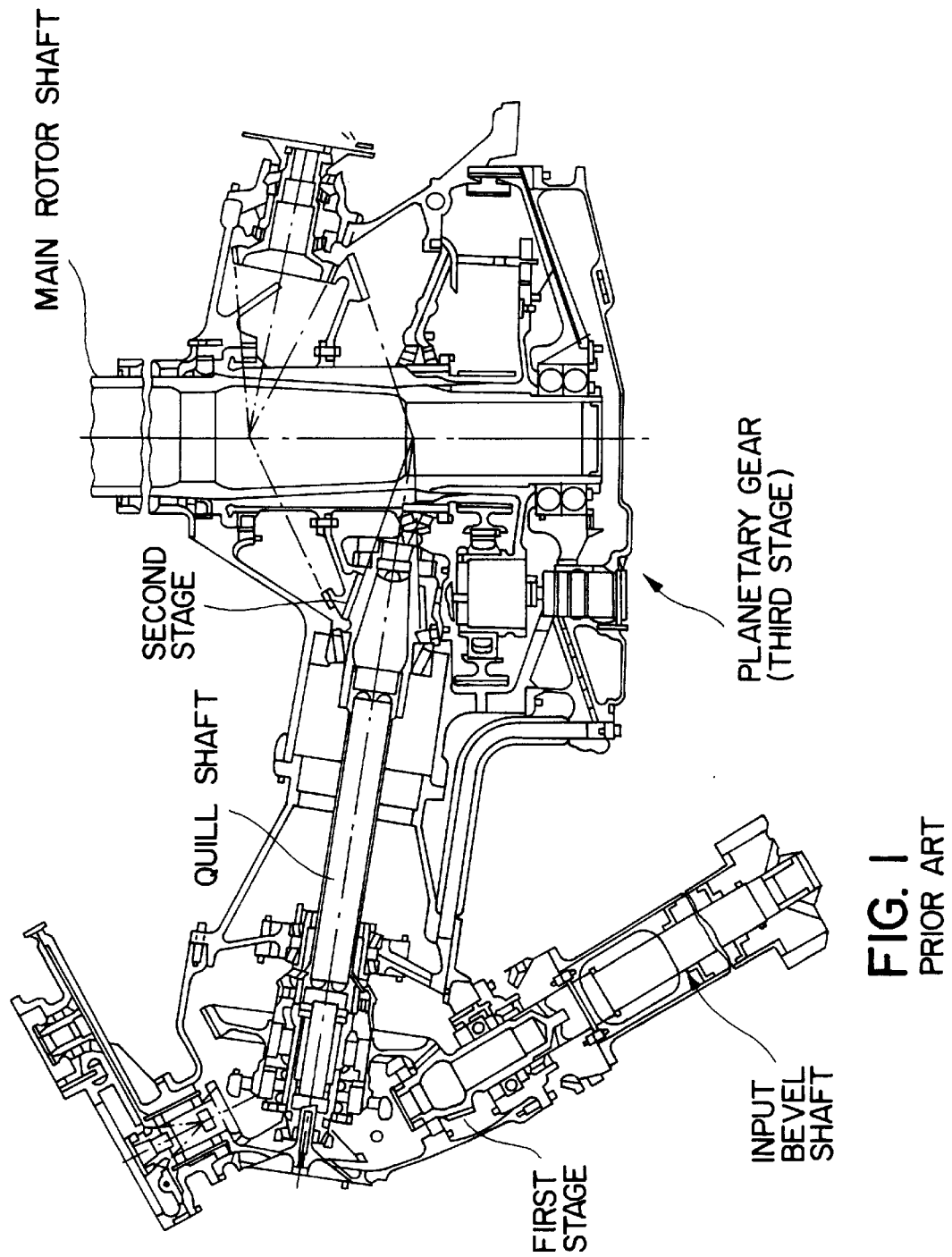
FIG. 1 shows a portion of a conventional three stage helicopter transmission.
Figure 2:
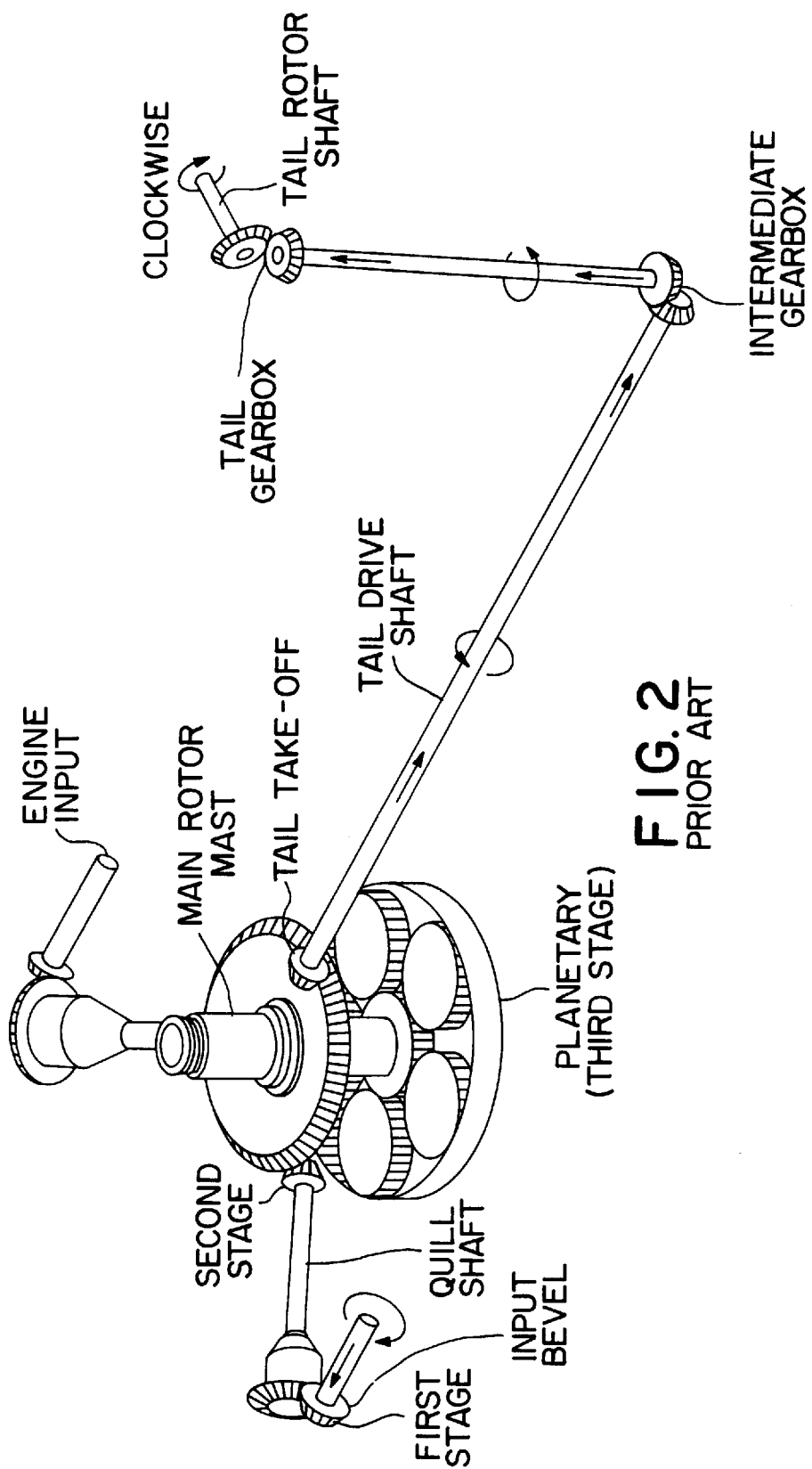
FIG. 2 shows a schematic of a conventional gear train for a helicopter.
Figure 3:
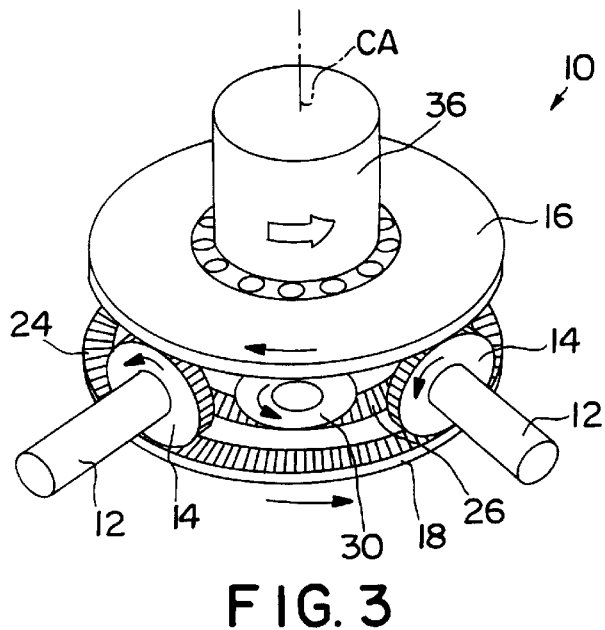
FIG. 3 shows a transmission arrangement according to the present invention.

Referring now to the drawings, wherein like numerals identify corresponding or similar elements throughout the several views, there is shown in FIG. 3 an embodiment of a transmission according to the present invention which is generally designated by the numeral 10. The transmission 10 is contemplated to be incorporated in a helicopter drive assembly (not shown). The transmission 10 will be discussed as it applies to a helicopter transmission. However, it should be understood that the invention is not intended to be limited to a helicopter transmission but is applicable to any system which requires a reduction in speed through a gearing arrangement. For the sake of simplicity, and in order to illustrate the meshing of the gears, the transmission housing is not illustrated in several of the figures. It is, however, shown in FIG. 4 and identified by the numeral 11. It is contemplated that a conventional housing would be utilized with the instant invention and can be made from any suitable material, such as aluminum, steel or titanium.

The transmission 10 receives input from at least one driving means (not shown), such as an engine. In the illustrated embodiment, it is contemplated that two engines provide input to the transmission. Each engine engages with an input shaft 12 so as to transit rotational motion from the engine to the input shaft 12. The attachment of the input shaft 12 to the engine is by any conventional means known in the art.

Mounted on the end of the input shaft 12 is an input gear 14. It is contemplated that the input gear 14 would be mounted to the input shaft 12 through a conventional mounting arrangement which provides for rotation of the input gear 14 concomitantly with the input shaft 12. One such conventional mounting arrangement is made by mating splines with a locking mechanism for preventing the input gear 14 from sliding off the input shaft 12. In the preferred embodiment, the input gear 14 and the input shaft 12 are formed as an integral unit. If the input gear and shaft 14, 12 are formed as separate elements, then the input gear 14 is preferably made from carburized hardened steel and the input shaft 12 is preferably made from heat treated steel. If the input gear and shaft 14, 12 are an integral unit, then the unit is preferably made from steel with carburized gear teeth. As will be discussed in more detail below, the input gear 14 is preferably either a bevel gear or a spur gear.

The input gear 14 is disposed between and meshes with first and second face gears 16, 18. For the sake of simplicity, the first and second face gears 16, 18 will be referred to as "upper" and "lower" face gears, respectively. However, the invention is not intended to be limited to any particular orientation but, instead, it is intended to refer to any orientation of two gears such that they face one another. The face gears also do not need to be parallel to one another. The important feature of the face gears 16, 18 is that they are both meshing with the input gear 14 such that rotation of the input gear 14 results in related motion of the face gears 16, 18.

Figure 4:
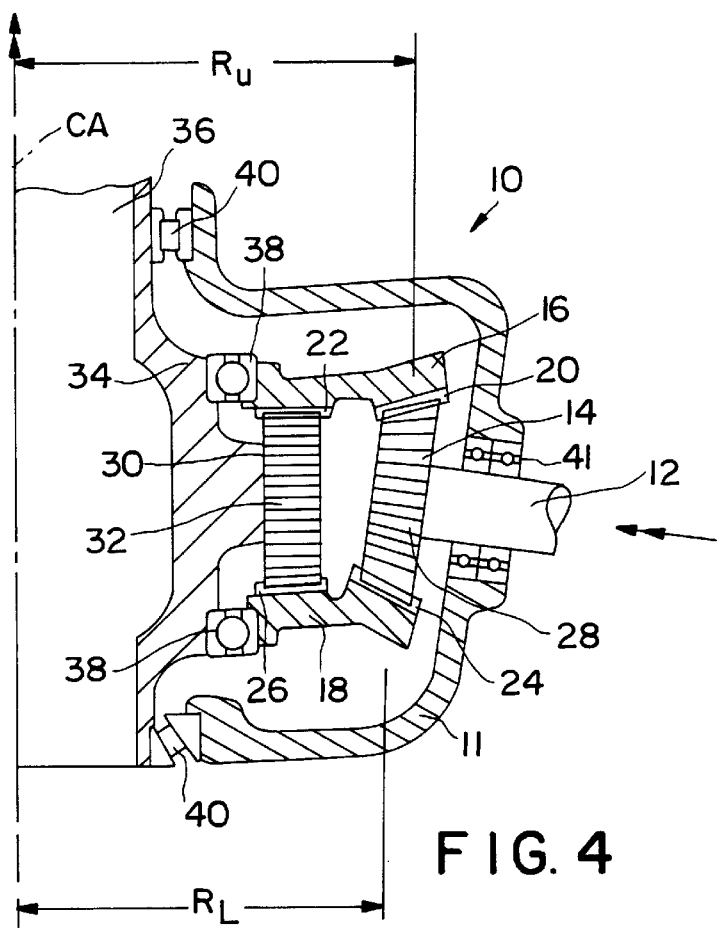
FIG. 4 shows a side view of a portion of a transmission arrangement according to the present invention.

As shown in FIGS. 3 and 4, the upper and lower face gears 16, 18 rotate about a common central axis designated as CA. As will be discussed in more detail below, the central axis CA is also the axis about which the output shaft 36 rotates.

The upper face gear 16 has a first set of upper gear teeth 20 formed on the side surface thereof. The first set of teeth 20 define a circular or annular pattern on the upper face gear 16. A second set of upper gear teeth 22 are also formed on the surface of the upper face gear 16. The second set of teeth 22 also define a circular or annular pattern which is located radially inward of and concentric with the first set of upper teeth 20. The first and second sets of teeth 20, 22 have an axis of rotation that is preferably coincident with the central axis CA. As the upper face gear 16 rotates, the first and second sets of upper teeth 20, 22 rotate simultaneously in the same direction.

Figure 5:
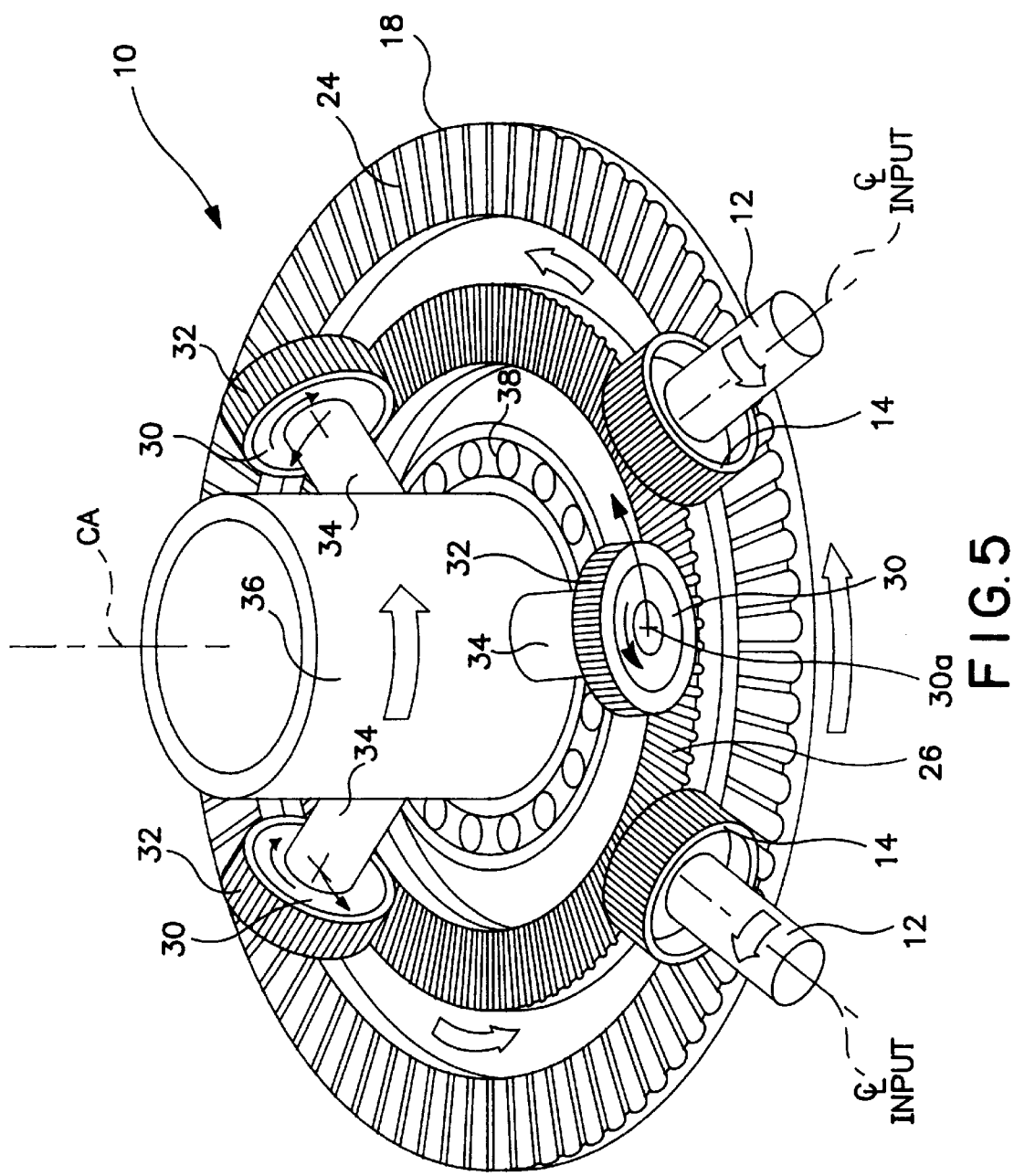
FIG. 5 shows a lower face gear of a transmission arrangement according to the present invention.

As shown in FIG. 5, the lower face gear 18 has a first set of lower gear teeth 24 formed on its surface. The first set of teeth 24 define a circular or annular pattern on the lower face gear 18. A second set of lower teeth 26 are also formed on the surface of the lower face gear 18. The second set of lower teeth 26 define a circular or annular pattern on the lower face gear 18 which is located radially inward of and concentric with the first set of lower teeth 24. Again, the first and second sets of teeth 24, 26 have an axis of rotation that is preferably coincident with the central axis CA. As the lower face gear 18 rotates, the first and second sets of gear teeth 24, 26 rotate simultaneously in the same direction.

As shown in FIG. 4, gear teeth 28 formed on the input gears 14 engage or mesh with the first sets of upper and lower gear teeth 20, 24 formed on the upper and lower face gears 16, 18. As such, rotation of the input gear 14 produces corresponding rotation of the upper and lower face gears 16, 18. However, the face gears move in opposite directions. For example, as shown in FIG. 3, rotation of the input gears 14 in the direction illustrated by the arrows produces rotation of the upper and lower face gears 16, 18 in opposite directions as indicated by the associated arrows.

As shown in FIG. 4, the second sets of upper and lower gear teeth 22, 26 mesh with at least one output pinion 30. More specifically, referring to FIGS. 4 and 5 (only the lower face gear 18 is shown in FIG. 5 for clarity), the output pinion 30 has teeth 32 which engage with the second sets of gear teeth 22, 26 such that rotation of the face gears 16, 18 (and the corresponding second sets of gear teeth 22, 26) produces rotation of the output pinion 30. The output pinion 30 is rotatably attached to a pinion shaft 34 by any conventional method which permits that output pinion 30 to rotate about the longitudinal axis of the pinion shaft 34. The pinion shaft 34 is mounted to a driven output shaft 36, such as a main rotor shaft in a helicopter. For the sake of simplicity, the output shaft 36 will be generally referred to as a main rotor shaft. Preferably, the pinion shaft 34 is fixedly attached to the main rotor shaft 36 by either welding or splines. Alternately, the pinion shaft 34 can be formed integral with the main rotor shaft 36. As will be described in more detail below, the attachment of the pinion shaft 34 to the main rotor shaft 36 results in the main rotor shaft 36 rotating about a central axis CA when the pinion shaft 34 is translated around the central axis CA.

Depending on the size and torque required, there can be more than one output pinion 30 and pinion shaft 34. The torque required to be transmitted to the main rotor shaft 36 determines how many pinions are required. In the illustrated embodiment, there are three output pinions 30 and corresponding shafts 34 radially disposed about the main rotor shaft 36. When more than one output pinion 30 is utilized, the pinions 30 are preferably spaced equidistantly from one another.

In order for the upper and lower face gears 16, 18 to rotate about the central axis CA irrespective of the rotation of the main rotor shaft 36, bearings 38 are disposed between the inner diameter of the face gears 16, 18 and the main rotor shaft 36. Suitable bearings include roller or ball bearing arrangements well known to those skilled in the art. Referring to FIG. 4, housing bearings 40 are located between the transmission housing 11 and the main rotor shaft 36 permitting the main rotor shaft 36 to also rotate within the housing 11. Bearings 41 are also preferably located between the housing 11 and the input shaft 12.

The operation of the differential speed transmission according to the present invention will now be described. The speed of the face gears 16, 18 are governed by the following equation:

$$RPM_{FACEGEAR} = \frac{N_{INPUTGEAR}}{N_{FACEGEAR}} (RPM_{INPUTGEAR})$$

Where: $RPM_{FACE\ GEAR}$ is the speed of rotation of the face gear;

$N_{INPUT\ GEAR}$ is the number of teeth on the input gear;

$N_{FACE\ GEAR}$ is the number of teeth on the face gear; and $RPM_{INPUT\ GEAR}$ is the speed of rotation of the input gear.

If the first sets of upper and lower gear teeth 20, 24 are located at the same radial distance from the center of rotation (i.e., the central axis CA) of the upper and lower face gears 16, 18, then the upper and lower face gears 16, 18 will rotate in opposite directions at the same speed. This is due to the fact that the first sets of upper and lower gear teeth 20, 24 must have the same number of teeth per inch in order to properly mesh with the input gear 14. Since the first sets of upper and lower gear teeth 20, 24 have the same number of teeth per inch and are at the same radial position, they will rotate at the same speed. Likewise, since the second sets of upper and lower gear teeth 22, 26 mesh with a common output pinion gear 30, the second sets of upper and lower gear teeth 22, 26 will also rotate at the same speed with respect to one another if they are located at the same radial distance from the central axis CA.

Hence, for identical upper and lower face gears 16, 18 with first and second sets of gear teeth located at identical distances from the central axis CA, rotation of the input shaft 12 will cause both the upper and lower face gears 16, 18 to rotate at the same speed in opposite directions. Since the second sets of gear teeth 22, 26 will also be rotating at the same speed, the output pinion 30 will rotate about its axis $30_A$ in a stationary position. That is, the output pinion 30 will not rotate about the central axis CA. If however, one of the face gears is rotating at a faster rate of speed than the other, the differential in speed of the face gears will drive the output pinion 30 to move in the direction of the faster moving face gear, i.e., the output pinion 30 will "walk" around the slower moving face gear. For example. if the upper face gear 16 is rotating at 100 RPM while the lower face gear 18 is rotating at 50 RPM, then the output pinion 30 will be driven in the direction of rotation of the upper face gear 16 around the central axis CA.

Since the output pinion 30 is mounted on the pinion shaft 34 which, in turn is mounted to the main rotor shaft 36, rotation of the output pinion 30 about the central axis CA will produce rotation of the main rotor shaft 36. The speed that the pinion shaft (and hence the main rotor shaft) will rotate about the central axis CA, is governed by the following equation:

$$RPM_{OUT} = (Speed_{ENGINE})(N_{INPUTGEAR}) \left( \frac{1}{N_{UPPERFACEGEAR}} - \frac{1}{N_{LOWERFACEGEAR}} \right)$$

Where: $RPM_{OUT}$ is the speed of the main rotor shaft;
$Speed_{ENGINE}$ is the speed input from the engine;
$N_{INPUT\ GEAR}$ is number of teeth on the input gear;
$N_{UPPER\ FACE\ GEAR}$ is number of teeth in the first set of teeth on the upper face gear; and
$N_{LOWER\ FACE\ GEAR}$ is number of teeth in the first set of teeth on the lower face gear.

In order to drive the upper and lower face gears 16, 18 at different speeds, the face gears must have different numbers of teeth in their respective first sets of teeth 20, 24. For example, differential speed between the upper and lower face gears 16, 18 can be achieved if the first set of teeth 20 on the upper face gear 16 has a total of 135 teeth while the first set of teeth 24 on the lower face gear 18 has a total of 140 teeth. Accordingly, the upper face gear 16 will turn faster than the lower face gear 18. The output pinion 30 will, therefore, walk around the lower face gear 18 resulting in rotation of the main rotor shaft 36 in the same direction as the upper face gear 16.

As stated above, since the first sets of upper and lower gear teeth 20, 24 must have the same number of teeth per inch in order to mesh with the common input gear, the only way to increase the total number of teeth on one of the face gears is to form the first sets of upper and lower gear teeth 20, 24 with different pitch diameters (i.e., different distances from the central axis of rotation CA). Referring to FIG. 4, $R_u$ defines the radial distance from the central axis CA that the first set of upper gear teeth 20 are located. $R_L$ defines the radial distance from the central axis CA that the first set of lower gear teeth 24 are located. The face gears 16, 18 have different pitch diameters if $R_u$ is greater than (or less than) $R_L$. As shown, $R_u$ is greater than $R_L$. Hence, the first set of upper gear teeth 20 has a larger pitch diameter (and corresponding larger number of teeth) than the first set of lower gear teeth 24.

In the embodiment shown in FIG. 4, the input gear 14 is a bevel gear so that the teeth on the input gear 14 can engage simultaneously with the first sets of upper and lower gear teeth 20, 24 within a reasonable range of pitch diameters. Theoretically, any range of pitch diameters is possible. However, the practical limits will be defined by envelope limits and manufacturing restrictions. Additionally, tooth loads and sliding velocities influence the overall the gear design. The first sets of upper and lower gear teeth 20, 24 are also preferably formed as bevel gears. The configuration shown in FIG. 4 will result in the input shaft 12 being at an angle which is slightly greater or less than perpendicular to the central axis CA. However, this angular orientation is not critical in a helicopter design since the main rotor shaft is, typically, angled slightly forward of the vertical in order to facilitate forward motion of the aircraft.

Figure 6:
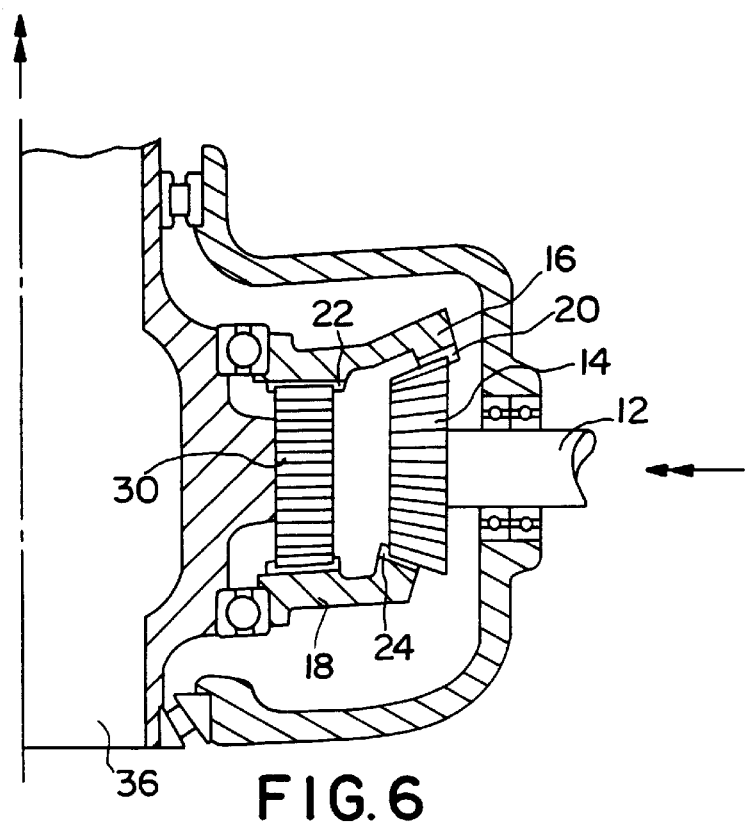
FIG. 6 shows a side view of an alternate embodiment of a transmission according to the present invention.

FIG. 6 is an alternate configuration of the present invention which permits that input shaft 12 to be perpendicular to the driven output shaft 36 (e.g., main rotor shaft). In this embodiment, a radially outboard portion of the input bevel gear 14 engages the first set of upper gear teeth 20 on the upper face gear 16. A radially inboard portion of the input bevel gear 14 engages the first set of lower gear teeth 24 on the lower face gear 18. The upper face gear 16 will rotate slower than the lower face gear 18. As such, the output pinion 30 will walk around the second set of upper gear teeth 24 causing the main rotor shaft 36 to rotate in the same direction as the lower face gear 18.

Figure 7:
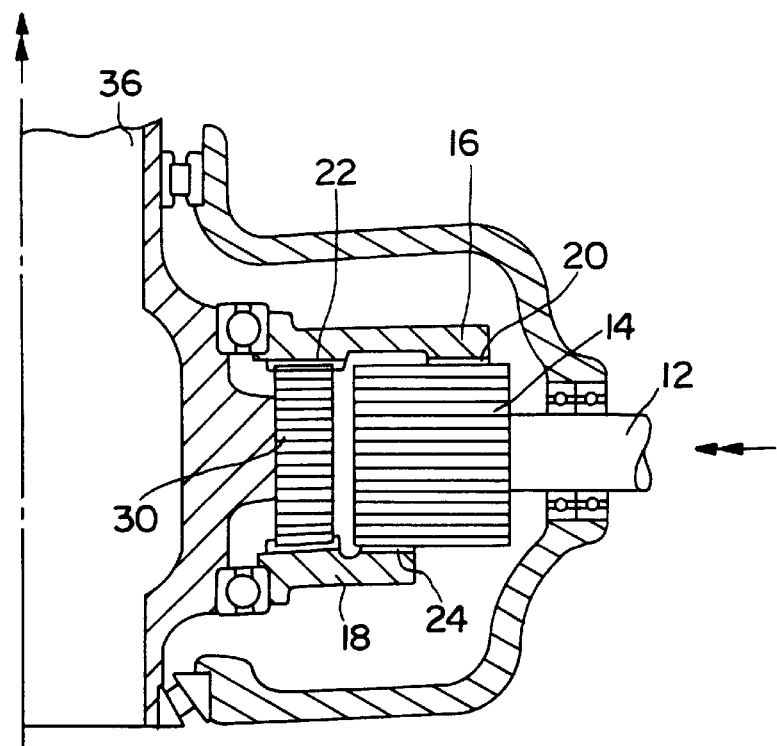
FIG. 7 shows a side view of another embodiment of a transmission according to the present invention.

FIG. 7 is another embodiment of the present invention configured to allow the input shaft 12 to be perpendicular to the driven output shaft 36. In this embodiment, the input gear is a spur gear. As with the previous embodiment, a radially outboard portion of the input gear 14 engages the first set of upper gear teeth 20 on the upper face gear 16. A radially inboard portion of the input gear 14 engages the first set of lower gear teeth 24 on the lower face gear 18. The upper face gear 16 will rotate slower than the lower face gear 18 since the first set of upper gear teeth has a larger pitch diameter. As a result, the output pinion 30 will walk around the second set of upper gear teeth 24 causing the main rotor shaft 36 to rotate in the same direction as the lower face gear 18.

Figure 8:
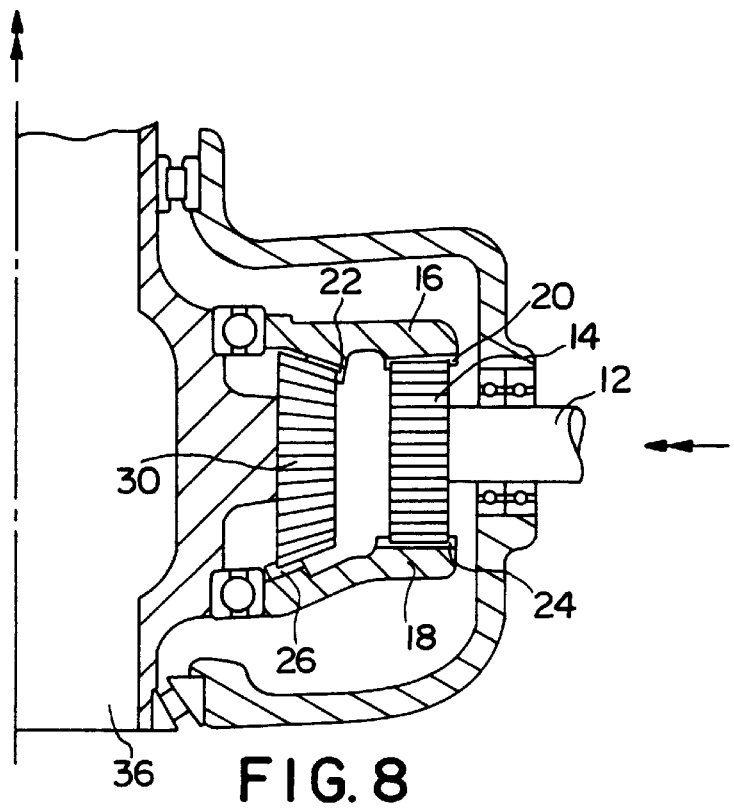
FIG. 8 shows a side view of yet another embodiment of a transmission according to the present invention.
Figure 9:
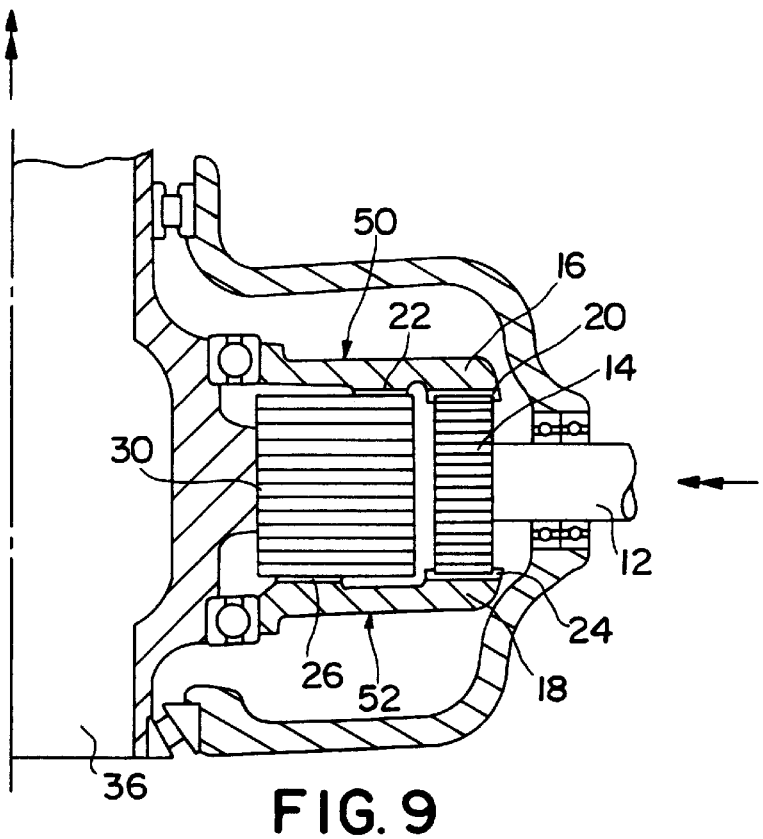
FIG. 9 shows a side view of yet another embodiment of a transmission according to the present invention.

FIGS. 8 and 9 illustrate further embodiments of the present invention. As with the previous embodiments, the input shaft 12 is mounted perpendicular to the driven output shaft 36. Alternate orientations are, of course, possible. In contrast to the previous embodiments which drive the main rotor shaft 36 by rotating the upper and lower face gears 16, 18 at different speeds, the embodiments in FIGS. 8 and 9 drive the upper and lower face gears at the same speed. That is, the first sets of upper and lower gear teeth 20, 24 are located at the same radial distance from the central axis CA. The rotation of the main rotor shaft 36 is instead achieved by locating the second set of upper gear teeth 22 at a different radial distance from the central axis CA than the second set of lower gear teeth 26. This difference in radial distances between the second sets of upper and lower gear teeth 22, 26 will cause the second set of gear teeth with the larger pitch diameter to drive the pinion at a slower rate. Accordingly, the output pinion 30 will walk around the slower rotating set of teeth in the direction of the faster rotating set driving the main rotor shaft 36 in the direction that the output pinion 30 is walking.

FIG. 8 illustrates this alternate embodiment with a bevel gear as the output pinion 30. FIG. 9 illustrates this alternate embodiment with a spur gear as the output pinion 30. While the input gear 14 is illustrated as a spur gear, alternate types of gears (e.g., bevel) may be substituted therefor.

The reduction ratio provided by the present invention is as follows.

$$RR = \frac{1}{N_{INPUTGEAR} \left( \frac{1}{N_{UPPERFACEGEAR}} - \frac{1}{N_{LOWERFACEGEAR}} \right)}$$

Where: RR is the reduction ratio for the transmission;
$N_{INPUT\ GEAR}$ is the number of teeth on the input gear;
$N_{UPPER\ FACE\ GEAR}$ is the number of teeth on the upper face gear; and
$N_{LOWER\ FACE\ GEAR}$ is the number of teeth on the lower face gear;

A transmission made according to the present invention can achieve gear reductions ranging between 50:1 up to 200:1.

When the present invention is utilized in a helicopter transmission, it is preferable to form the gears from carburized hardened steel. The shafts are preferably made from heat treated steel. The intended use of the invention will determine the materials that would be most desirable. For example, if the invention is utilized in a transmission for a hand tool or mechanized toy, the preferred materials may be aluminum or plastic. Those skilled in the art would readily be capable of choosing the proper materials and sizes for any intended use.

As discussed above, the present invention solves many deficiencies in present day helicopter transmissions, such as decreasing the number of components necessary to provide the desired reduction in RPM in a transmission, reduction in the transmission envelope, elimination of one stage in the drive train, and reduction in weight. Additionally, many modern military helicopters, such as Sikorsky Aircraft Corporation's BLACKHAWK™ helicopter, utilize two engines mounted on either side of the aircraft centerline. This type of mounting arrangement functions well with the transmission configuration of the present invention. As shown in FIG. 3, the engines can be mounted at an angle to one another thereby permitting the input shafts 12 from the engine to engage directly with the upper and lower face gears 16, 18. Alternately, an intermediate stage can be utilized if the necessary mounting of the engines is not feasible.

In a helicopter transmission, it is common to drive accessory components and the tail rotor directly off of the transmission. The present invention can be modified to incorporate gear teeth on the upper surface 50 of the upper face gear 16 or the lower surface 52 of the lower face gear 18 (FIG. 9). Alternately, an additional output pinion (not shown) could be located between the first sets of upper and lower gear teeth 20, 24, such that rotation of the upper and lower face gears 16, 18 produces corresponding rotation of the additional output pinion.

In the illustrated embodiments, the face gears 16, 18 are each shown as a singular or integral component. It is, however, contemplated that the face gears 16, 18 can be formed in a variety of ways. For example, the first and second sets of gear teeth could be separate annular rings which are removably or fixedly attached to one another by a series of radial spokes. Alternately, the rings can be removably attached to a common backing plate. Such a configuration permits replacement of a set of gear teeth if it becomes damaged.

An example of the present invention in a helicopter transmission is as follows. In a helicopter with two engines providing 1000 horsepower per engine, the input speed from the engine is approximately 20,000 RPM. The maximum transmission envelope is about 36 inches in diameter. The desired reduction ratio is preferably about 100:1. The following transmission arrangement would be sufficient to achieve the desired gear reduction.

| Gear | Teeth | Pitch | Pitch Dia. | Outside Dia. | Face Width | Speed |
|---|---|---|---|---|---|---|
| Input Gear | 40 | 5.00 | 8.00 | 8.40 | 1.00 | 20,000 |
| First set of Lower Gear Teeth | 140 | 5.00 | 28.00 | 30.00 | 1.00 | 5714.3 |
| First set of Upper Gear Teeth | 135 | 5.00 | 27.00 | 29.00 | 1.00 | 5925.9 |
| Output Pinion | 40 | 5.00 | 8.00 | 8.40 | 1.25 | 5714.3 |
| Second Set of Upper Gear Teeth | 110 | 5.00 | 22.00 | 24.50 | 1.25 | 5925.9 |
| Second Set of Lower Gear Teeth | 110 | 5.00 | 22.00 | 24.50 | 1.25 | 16,005 |

The output shaft 36 speed around the central axis CA would be:

$$RPM_{OUT} = (20,000)(40)\left(\frac{1}{135} - \frac{1}{140}\right) = 211.6\, RPM$$

The overall reduction ratio would be 20,000/211.6=94.5.

While the primary emphasis of this invention has been directed toward a helicopter transmission, those skilled in the art would readily appreciate the benefits attributable to the invention when used in any desired transmission arrangement.

By reducing the number of stages in a transmission according to the present invention, the chances of high vibration mesh are reduced. Any decrease in vibration output by the transmission will have a corresponding reduction in the overall noise level generated by the transmission.

Figures 10A and 10B illustrate a conventional transmission and engine arrangement 100 in a helicopter. Two engines 102 are typically mounted to the aft and either side of a central axis 104 of a main rotor shaft 106 which extends through a main transmission 108. An input bevel shaft 110 extends outward and forward from each engine 102. The input bevel shaft 110 meshes with a quill shaft 112 at a first stage reduction 114. The first stage reduction 114 is typically located forward of the main transmission 108. The engines 102 and input bevel shaft 110 usually have a longitudinal axis that is substantially horizontal. The longitudinal axis is also approximately parallel to the longitudinal axis of the aircraft 116. The central axis 104 of the main rotor shaft 106 is typically oriented at an angle (identified as α) less than 90 degrees to the longitudinal axis of the aircraft 116 (and the longitudinal axis of the engines). That is, the central axis of the main rotor shaft is angled forward with respect to the aircraft to provide the aircraft with forward motion. The angle α can range between approximately 84 degrees and 88 degrees.

Referring now to FIGS. 11A and 11B, an arrangement of the present invention is shown as it is contemplated in a helicopter. In this embodiment, two engines 120 are mounted in the helicopter and are angled (identified as β) with respect to the longitudinal axis 122 of the aircraft. The angle β is preferably between about 15 degrees and about 40 degrees. The most preferred angle is about 30 degrees. As shown the present invention eliminates the need for a first stage. Accordingly, the engines 120 can be oriented such that their longitudinal axis extends directly toward the central axis 124. The input shaft 126 from the engine will engage directly with the first and second face gears through the input pinion. As discussed above, the angular orientation of the main rotor shaft and central axis permits the pitch diameter of the first (upper) face gear to be larger than the second (lower) face gear while allowing the input shaft of the engine to be substantially horizontal.

Although the invention has been described and illustrated with respect to the exemplary embodiments thereof, it should be understood by those skilled in the art that the foregoing and various other changes, omissions and additions may be made therein and thereto, without parting from the spirit and scope of the present invention.

I claim:

1. A transmission for transmitting rotational motion from an engine input shaft to a driven output shaft, the transmission comprising:
   a first face gear having a first set of teeth formed thereon in an annular pattern about a central axis, and a second set of teeth formed thereon in an annular pattern about the central axis, the second set of teeth being located within and concentric with the first set of teeth, the first and second sets of teeth being formed on a common side of the first face gear;

a second face gear positioned adjacent to at least a portion of the first face gear, the second face gear having a first set of teeth formed thereon in an annular pattern about the central axis, and a second set of teeth formed thereon in an annular pattern about the central axis, the second set of teeth being located within and concentric with the first set of teeth, the first and second sets of teeth being formed on a common side of the second face gear;

an input gear adapted to be driven by the engine input shaft, the input gear disposed between and engaged with the first sets of teeth on the first and second face gears, wherein rotation of the input gear produces rotation of the first and second face gears in opposite directions about the central axis;

a pinion shaft adapted to drive a driven output shaft about a center of rotation that is coincident with the central axis; and an output pinion rotatably mounted to the pinion shaft and being disposed between and engaged with the second sets of teeth on the first and second face gears, wherein rotation of the first and second face gears produces corresponding rotation of the output pinion about the pinion shaft and rotation of the pinion shaft about the central axis.

2. A transmission according to claim 1 wherein there are a plurality of output pinions mounted on a corresponding number of pinion shafts.

3. A transmission according to claim 2 wherein the pinion shafts are formed integral with the driven output shaft.

4. A transmission according to claim 1 wherein there are a plurality of input gears, each input gear adapted to be driven by an associated engine input shaft.

5. A transmission according to claim 1 wherein the first set of teeth on the first face gear has a pitch diameter which is different than the pitch diameter of the first set of teeth on the second face gear.

6. A transmission according to claim 5 wherein the first set of teeth on the first face gear has a pitch diameter which is greater than the pitch diameter of the first set of teeth on the second face gear.

7. A transmission according to claim 5 wherein the first set of teeth on the first face gear has a pitch diameter which is less than the pitch diameter of the first set of teeth on the second face gear.

8. A transmission according to claim 1 wherein rotation of the input gear results in rotation of the first face gear and second face gear at different speeds.

9. A transmission according to claim 1 wherein the first set of teeth on the first face gear are parallel to the first set of teeth on the second face gear.

10. A transmission according to claim 1 wherein the transmission is located within a helicopter, and wherein the driven output shaft is the main rotor shaft.

11. A transmission according to claim 1 wherein the second set of teeth on the first face gear has a different pitch diameter than the second set of teeth on the second face gear.

12. A helicopter drive train comprising:

at least one engine for rotating an engine input shaft at a first speed;

an upper face gear rotatably disposed about a central axis, the upper face gear having inner and outer rings of teeth which are concentric with one another and which have a center of rotation substantially coincident with the central axis;

a lower face gear rotatably disposed about the axis of a main rotor shaft, the lower face gear having inner and outer rings of teeth which are concentric with one another and which have a center of rotation substantially coincident with the central axis;

an input gear mounted on the engine input shaft and disposed between the upper and lower face gears, the input gear having teeth formed thereon which mate with the outer rings of teeth on the upper and lower face gears, wherein rotation of the input gear produces rotation of the upper and lower face gears in opposite directions about the central axis;

a pinion shaft;

an output pinion rotatably mounted to the pinion shaft and disposed between the upper and lower face gears, the output pinion having teeth formed thereon which mate with the inner rings of teeth on the upper and lower face gears, wherein rotation of the upper and lower face gears produces rotation of the output pinion about the pinion shaft;

a main rotor shaft having a center of rotation that is substantially coincident with the central axis, the pinion shaft being formed on the main rotor shaft;

wherein rotation of the upper and lower face gears about the central axis produces corresponding rotation of the pinion shaft and main rotor shaft about the central axis.

13. A helicopter drive train according to claim 12 wherein there are a plurality of output pinions mounted on a corresponding number of pinion shafts, and wherein the pinion shafts are formed integral with the main rotor shaft.

14. A helicopter drive train according to claim 12 wherein there are a plurality of input gears, each input gear being driven by an associated engine input shaft.

15. A helicopter drive train according to claim 12 wherein the outer ring of teeth on the upper face gear has a pitch diameter which is different than the pitch diameter of the outer ring of teeth on the lower face gear.

16. A helicopter drive train according to claim 15 wherein the outer ring of teeth on the upper face gear has a pitch diameter which is greater than the pitch diameter of the outer ring of teeth on the lower face gear.

17. A helicopter drive train according to claim 15 wherein the outer ring of teeth on the upper face gear has a pitch diameter which is less than the pitch diameter of the outer ring of teeth on the lower face gear.

18. A helicopter drive train according to claim 12 wherein rotation of the input gear results in rotation of the upper face gear and lower face gear at different speeds.

19. A helicopter drive train according to claim 12 wherein the inner ring of teeth on the upper face gear has a different pitch diameter than the inner ring of teeth of the lower face gear.

20. A helicopter drive train according to claim 12 wherein the speed at which the main rotor shaft rotates is different than the speed at which the engine input shaft rotates.

21. A helicopter drive train according to claim 12 wherein the at least one engine has a longitudinal axis which extends substantially toward the central axis.

22. A helicopter drive train according to claim 21 wherein the longitudinal axis of the engine forms an angle with respect to the central axis which is less than approximately 90 degrees.

23. A helicopter drive train according to claim 22 wherein the angle is between approximately 82 degrees and 88 degrees.

24. A helicopter drive train according to claim 12 wherein the at least one engine has a longitudinal axis which forms an angle with respect to a longitudinal axis of the helicopter.

25. A helicopter drive train according to claim 24 wherein the angle formed by the longitudinal axis of the engine with respect to the central axis is between approximately 15 degrees and 40 degrees.

26. A helicopter drive train according to claim 25 wherein the angle is about 30 degrees.

27. A differential speed transmission comprising:
- a first face gear rotatably disposed about a central axis, the first face gear having first and second sets of teeth which are concentric with one another and which have a center of rotation substantially coincident with the central axis, the first set of teeth being radially outwardly from the second set of teeth;
- a second face gear rotatably disposed about the central axis, the second face gear having first and second sets of teeth which are concentric with one another and which have a center of rotation substantially coincident with the central axis, the first set of teeth being radially outwardly from the second set of teeth;
- an input shaft adapted to be driven by an engine, the input shaft being in a substantially fixed location with respect to the differential speed transmission;
- an input pinion attached to and adapted to be rotatably driven by the input shaft, the input pinion being engaged with the first sets of teeth on the first and second face gears for rotating the first and second face gears in opposite directions about the central axis;
- at least one output pinion engaged with the second sets of teeth on the first and second face gears for rotating an output shaft about the central axis; and
- a driven shaft having a longitudinal axis coincident with the central axis, the output shaft being mounted to the driven shaft and adapted to rotate the driven shaft about its longitudinal axis as the output shaft rotates about the central axis.

28. A differential speed transmission according to claim 27 wherein the transmission is mounted within a helicopter and wherein the driven shaft is the main rotor shaft in the helicopter.

29. A differential speed transmission according to claim 27 wherein the input shaft has a longitudinal axis which extends substantially toward the central axis.

30. A differential speed transmission according to claim 29 wherein the longitudinal axis of the input shaft forms an angle with respect to the central axis which is less than approximately 90 degrees.

31. A differential speed transmission according to claim 30 wherein the angle is between approximately 82 degrees and approximately 88 degrees.

32. A differential speed transmission according to claim 27 wherein the first set of teeth on the first face gear has a pitch diameter which is greater than the pitch diameter of the first set of teeth on the second face gear.

33. A differential speed transmission according to claim 27 wherein the first set of teeth on the first face gear has a pitch diameter which is less than the pitch diameter of the first set of teeth on the second face gear.

34. A differential speed transmission according to claim 27 wherein rotation of the input shaft results in rotation of the first face gear and second face gear at different speeds.

35. A differential speed transmission according to claim 27 wherein the second set of teeth on the first face gear has a different pitch diameter than the second set of teeth on the lower face gear.

* * * * *